United States Patent Office 3,567,666
Patented Mar. 2, 1971

3,567,666
SEPARATION MEANS
Carl Berger, 13401 Kootenay, Santa Ana, Calif. 92705
No Drawing. Filed Feb. 2, 1968, Ser. No. 702,525
Int. Cl. C08f 47/10; C08v 1/16
U.S. Cl. 260—2.5
9 Claims

ABSTRACT OF THE DISCLOSURE

This invention relates to a novel composite product which is employed as a separation means in reverse osmosis, gas mixtures and galvanic devices. The efficient separation mode is a result of the channel structure of the polymer coupled with the uniform porosity of the particulate within the polyer.

---

This invention relates to a composite product which may be utilized in different forms such as films, tubes, hollow capillaries and other geometrical forms. The particular applications described herein are oriented toward separation processes. The composite product consists of a polymer and particules incorporated therein with the particules serving as a selective barrier to the passage of certain molecules and ions. This is possible because of the special uniform pore structure of the particulates and a continuous channel structure in the polymer.

There are available throughout the literature numerous instances of polymer composites. In almost all cases the particulates are added to change the gross physical and chemical nature of the material. For instance, strength, resilience, opacity and dielectric constant can be improved. Cost, if inexpensive particulates such as sand or limestone are used, can be lowered. In such heterogeneous products the particulate is functional only as a filler of void space. The material enveloping it is in direct contact and unless the filler particles touch each other physically there is no continuity between them.

It is clear that the materials described above would be of little value in a separation process since the functionality of the particles is masked. Moreover, if a separation process is to be truly efficient, the pore structure must be exceedingly uniform. In the case of most inorganic particulates such as kaolin, olivene and ceria, analysis of the pore structure indicates that pore structure is random irregular and not uniformly oriented. It has been found, however, that certain leached glasses and other particulates have highly uniform pore structures.

Because of the strength, flexibility, shock resistance and processing ease of films, a composite incorporating particulate of uniform porosity as described above was developed. The film had to have the characteristics required in films and yet provide continuous channels between the particulates and ultimately between the two surfaces of the membrane. Films of this kind may be produced by mixing the particulates in a polymer solution or dispersion. After film calendering or extrusion the solvent may be partially evaporated and the film is cured by immersion in water or aqueous solution. For a polymer or any repeating unit material to form a satisfactory film in aqueous applications it must water coagulate in the sense that mild hydrophilicity exists and manifests itself in the establishment of the aforementioned channel-like network.

The complementary properties of the granular particulates and the channel containing film gives rise to unexpected properties in the separation of ions from solvents, gas separation and applications in galvanic cells. Typical among such applications is the use of a film or tubular form in reverse osmosis. Whereas cellulose acetate is usually employed in conventional systems and seriously deteriorates over a period of time due to the high pressures employed and when applied to high saline water such as sea water. The films of the present invention are not affected by the high pressure which cause film collapse in cellulose acetate and can readily be emplyoed in highly saline solutions.

Another application of this novel product is as a matrix in fuel cells. It is of particular value because the particles themselves are highly absorbtive and therefore hold tenaciously fluid electrolyte required for proper fuel cell performance. Electrolytes which may be employed are acid electrolytes such is phosphoric acid and sulfuric acid and alkaline electrolytes. Neutral solutions may also be employed.

It has also been discovered that in the range of particulates employed gases and vapors of differing molecular volumes may be separated. For instance, the separation ratio is about 4:1 for hydrogen and oxygen. Therefore, it can be observed that one stage or multiple stage devices could be constructed for various degrees of separation using single or multiple step systems.

It is therefore one object of this invention to produce a unique composite product containing particles with interconnected pores and said particles being suspended in a polymer. The particles are connected to each other and are enveloped by channels.

It is another object of this invention to form films produced from the unique composite materials.

It is another object of this invention to form hollow cylinders produced from the composite materials.

Moreover it is another object of the invention to produce composite materials the particles of which are porous by virtue of molecular constituents being leached out.

Another object of this invention is the application of the unique product of this invention in reverse osmosis desalination equipment.

Another object of this invention is the application of the unique product of this invention in galvanic devices.

Another object of this invention is the application of the unique product of this invention in gas separation devices.

These and other objects and advantages of the invention will become apparent upon reading the following description:

I have invented a unique product consisting of polymer containing particles, said particles having interconnected pores. Moreover the particles themselves are joined by a network of channels providing a continuous route of egress for mass transport.

The channels which envelop the particulates must be equal to or less in diameter than the pores in the particulates in order to prevent the separable species from finding an alternate migration route through the separating means.

The particles in question may be inorganic, polymeric or metallic. The preferred materials are those consisting of predominantly silicon dioxide such as these constituted of at least 95% silica. The pore structure of some of these materials is produced by leaching out certain molecular phases of specific glasses. One example of such a material is Corning Vycor 7935. The pore diameter of this material is about 35–45 angstroms but suitable materials such as Porasil exist which extend the pore diameter range from about 20 to about 1500 angstroms. The chemical composition of Vycor 7935 is 96% silicon dioxide and about 4% $B_2O_3$, $Al_2O_3$, $Cr_2O_3$. The composition of Porasil is essentially 100% silicon dioxide. In both of these materials the pore diameters are uniform with little variance.

Other materials that may be employed are inorganic materials such as molecular sieves, microporous Teflon (polytetrafluoroethylene) and polyvinylchloride as well as porous aluminum and stainless steel. The pore diameter range will fall approximately in the range described for Porasil and must be reasonably uniform. For all materials the gross diameter of the particles themselves must be five to ten times the diameter of the pores contained within the particle itself. A suitable mesh size for the gross particle is less than 325 mesh.

The polymers employed in the composite product can be various organic or inorganic repeating unit materials. As described above the polymer must have certain characteristics. Firstly it must have filming and/or satisfactory casting or molding properties from a solvent solution. Such polymers are polysulfone, polyvinylidene chloride and polyphenylene oxide.

A variety of solvent solutions have been employed such as dimethylformamide, acetone, dimethylacetamide, formamide, diacetone alcohol, chloroform and toluene. These solvents must dissolve the polymer to be employed or hold them in colloidal suspension. Moreover, they should be reasonably volatile and soluble in the solvent in which the film may ultimately be employed. The preferred solvents employed are dimethyl formamide and dimethylacetamide for polyvinylidene chloride polymer and polysulfone. Water is the secondary solvent in many cases, i.e., the solvent in which the film is soaked after film formation and the medium in which the film may be employed for reverse osmosis and other applications.

The nature of the polymer and the primary solvent in which it is dissolved determine the filming and curing conditions. For instance, if a strong tubular structure is required and a 85% by weight inorganic particulate loading is desired, the tubes can be maintained in an oven at 100–125° C. for about one minute to 24 hours depending on the strength requirement. They are then soaked in water or an aqueous solution for about one minute to 24 hours. The conditions described would apply, for instance to the polymer-solvent system polyvinylidene chloride and dimethylacetamide. It should be noted that if great flexibility is required then the film may be immersed into the water or aqueous solution with little or no evaporative heating. However, the film may require a woven or fibrous mat for support in this case.

The following examples illustrate the novel compositions and applications of the present invention:

EXAMPLE 1

To 5.0 grams of a 20% polyvinylidene chloride solution in dimethylacetamide are added about 1.0 cm.$^3$ of dimethylacetamide. The additional solvent is required so that uniform mixing can occur. Three (3.0) grams of powdered 96% silica Vycor glass is added to the solution and after uniformly dispersing it, the mixture is poured into a Petri dish and placed in an oven at 100° C. for 0.6 hour. At the end of this period the film is immersed in water for 2.0 hours and then removed for testing. The disc is 8.7 cm. in diameter and 0.5 mm. in thickness. The film is strong and slightly flexible. After trimming the film is placed in a reverse osmosis cell as depicted in "Membranes, Technology and Economics" by Dr. R. N. Rickles, p. 106, Library of Congress Catalog Number 66–29540. At a pressure of 40 atmospheres and a feed solution of NaCl of 5000 p.p.m. a salt rejection of about 75% was obtained in the product effluent.

Two experiments identical to the preceding were performed except that Georgia kaolin and olivene were employed instead of the Vycor glass powder of the example. In several experiments a salt rejection of 0–10% were recorded. Natural materials such as kaolin particulates have nonuniform pores, cracks and fissures thereby having an inefficient ability to screen or hinder ion transport while uniform molecular channels can indeed screen efficiently.

EXAMPLE 2

The experiment was similar to Example 1 except that 9.0 grams of powdered glass was used and 3.0 cm.$^3$ of dimethylacetamide. The salt rejection was about 80%.

EXAMPLE 3

An experiment similar to Example 1 was performed except that no heat was applied prior to immersion. The film was not as strong and was more flexible than that of Example 1. Moreover, the salt rejection was 65%. Such films may be reinforced by pouring the original polymer solution onto a synthetic or natural fiber mat which serves as a backing after film formation. Salt rejection remains about the same when a 0.125 mm. mat of Webril (polypropylene) is used.

EXAMPLE 4

The experiment was similar to Example 1 except that Porasil Type A glass (100 A. pore diameter) was used. The salt rejection was about 70%.

EXAMPLE 5

An experiment similar to Example 4 was performed except that polyphenylene oxide was employed as the polymer and chloroform as the solvent. Salt rejection rates were about 70%.

If the oven temperature for the preceding is maintained at 125° C. for two hours the salt rejection rate averaged about 75%. Moreover, if only 3.0 grams of the polymer solution is employed (or approximately a 50% by weight loading of inorganic particulates) then the rejection ratio is diminished to about 10 to 40%.

EXAMPLE 6

Using ingredients described in Example 2 a tube about one inch in diameter and nine inches long was formed and then processed as in Example 1. Employing one tube of the reverse osmosis apparatus described in "Membranes-Technology and Economics" (p. 110) by Dr. R. N. Rickles, Library of Congress Catalog Number 66–29540, a salt rejection in one stage of about 78% was achieved.

It should be noted that the composite product of this invention can be spun or drawn into very fine hollow cylinders or capillaries by conventional procedures and employed, as shown in the Chemical and Engineering News, Oct. 23, 1967, p. 66, in still another form of reverse osmosis apparatus.

EXAMPLE 7

The ingredients of Example 2 were utilized in this experiment. The film was heated at 100° C. for one hour and then immersed in 10% $H_3PO_4$ for 24 hours. After removing surface moisture, it was found that about 25% electrolyte by weight had been absorbed by the membrane. This membrane was then equilibrated in 85% $H_3PO_4$ for 24 hours and employed as a matrix in a fuel cell as depicted in "Hydrocarbon Fuel Cell Technology," chapter by C. Berger and M. P. Strier, p. 491, Library of Congress Catalog Card No. 65–28369. At a flow rate of 2 cm.$^3$ per minute of propane and 4 cm.$^3$ per minute of oxygen a voltage of 0.7 v. and 10 ma. per cm$^2$ was recorded at 150° C.

EXAMPLE 8

An experiment similar to that described in Example 7 was performed. However, a solution of polysulfone in toluene was employed. Such polysulfone is marketed by Union Carbide and is a thermoplastic resin having the repeating unit

$(—C_6H_4C(CH_3)_2C_6H_4OC_6H_4SO_2C_6H_4O—)_{n=50-80}$

The resultant fuel cell performance was better (0.75 v. and 10 ma. per cm.$^2$) since the cell could be run at a higher temperature of 175°. This was possible because of polysulfone's superior resistance to heat.

EXAMPLE 9

A film similar to that of Example 1 is produced except that 2.5% of Macaloid, a synthetic lithium hydroxyfluorosilicate, is added to the polymer solution before the addition of the glass particulates. Macaloid aids in film formation and also holds on tenaciously to water in the film. This particular film was employed in separating hydrogen and oxygen in a permeation septum as depicted in "Membrane Processes for Industry" (1966) p. 213, Library of Congress Catalog Card Number 66–30620. Whereas an equimolar mixture of oxygen and hydrogen had been in the original gas, a ¼ molar mixture was recovered from the permeate outlet.

Other agents such as Propaloid T, an organic modification of Macaloid may be used as additives to absorb moisture, modify film properties and provide stability. The other agents may include silica gel and plasticizers, cross linkers and film formers conventionally used with the specific polymer employed. The range of weight percent of additive ranges from about 0.1 to about 25.0.

EXAMPLE 10

An experiment similar to Example 8 was performed except that a polypropylene mat about 0.125 mm. was put into matrix. The matrix was much stronger. The performance of the fuel cell was reduced to 0.73 v. and 10 ma. per cm.$^2$ but the cell ran successfully for 300 hours versus 100 hours previously attained in Example 8.

EXAMPLE 11

The polymer solution of Example 6 was employed. It was impregnated into a porous ceramic cylinder about one inch in diameter and several inches long. After draining the excess polymer solution the cylinder was immersed in water at room temperature for 30 minutes. The tube was placed into the apparatus described in Example 6 and achieved a desalination in one stage of about 55%.

Loadings of between about 25–95% by weight of inorganic particulates have been employed with positive results. It has been found that for most applications, loadings of 70–95 are optimal and are therefore preferred. It may well be that at lower loadings that the channel-like structures referred to previously may be discontinuous and therefore unable sufficiently to provide sufficient continuous paths between the two lateral surfaces of the film.

While organic and metal particulates such as polyvinyl chloride and aluminum have been formed and tested as in Example 1 with the organic particulate or the metal replacing the inorganic glass, it has been found that the performance of such films is inferior to those employing the silica containing materials. This is true even though the pore dimensions are uniform and in the appropriate range. One possible reason may be that the charge on pendant silicon radicals in the glass channels may provide a supplementary screening effect in addition to the uniform channels. Based on this presumption "molecular sieves" which are inorganic complex alumino silicates with very uniform molecular channels should also be of value as incorporated particulates.

Various film thicknesses and capillary wall thicknesses have been employed in the range of about .025 mm. to about 2.5 mm. with a preferred range of about 0.1 mm. to about 1.0 mm. Such thicknesses can be easily controlled by applicator blade settings and variable distance rollers or by simply putting less material in a Petri dish.

As described above backing supports of various materials such as fiber glass, cellulose, polypropylene, polyester and other materials are used in mat or fiber form to strengthen the weaker and more flexible compositions. It is also feasible and has been tested to deposit the polymer film on porous ceramic and other supports when this is deemed desirable.

TABLE OF ABBREVIATIONS AND EXPLANATION

| | |
|---|---|
| Boron oxide | $B_2O_3$ |
| Aluminum oxide | $Al_2O_3$ |
| Chromium oxide | $Cr_2O_3$ |
| Centimeter | cm. |
| Millimeter | mm. |
| Angstrom | A. |
| Phosphoric acid | $H_3PO_4$ |
| Cubic centimeter | cm.$^3$ |
| Volt | v. |
| Milliamperes per square centimeter | ma. per cm.$^2$ |
| Degrees centigrade | ° C. |

Particle is equivalent to particulate.

Having described the invention, I claim:

1. A composite product having a pore structure rendering said product useful in reverse osmosis, gas separation and galvanic devices, which comprises a polymer having channels therein, and particles contained in said polymer, said particles having uniform interconnected pores, said particles being joined by said channels, the pores of said particles having a diameter in range of about 20 to about 1500 A., said channels in said polymer having a diameter not greater than the diameter of said pores in said particles, said particles being composed of a material selected from the group consisting of silicon dioxide, glass, aluminosilicates, aluminum, stainless steel, microporous polytetrafluoroethylene and polyvinyl chloride, and wherein said polymer is selected from the group consisting of polyvinylidene chloride, polysulfone and polyphenylene oxide, said product containing about 25–95% of said particles by weight.

2. The composite product of claim 1 wherein it is a composite film.

3. The composite product of claim 1 wherein it is a composite hollow cylinder.

4. The composite film of claim 2 wherein the pores of the particles have diameters in the range of about 20–1500 A.

5. The composite film of claim 2 wherein the particles are glass particles and are constituted of about 96% silicon dioxide and about 4% $B_2O_3$, $Al_2O_3$, $Cr_2O_3$ and the pore diameter is about 35–45 A.

6. The composite hollow cylinder of claim 3 wherein the particles are constituted of at least 95% silica and the pore diameter is in the range of about 35–1500 A.

7. The composite product of claim 1 wherein the polymer is polysulfone.

8. A composite product as defined in claim 1, said particles being uniformly dispersed in said polymer, the diameter of said particles ranging from five to ten times the diameter of the pores of said particles, said particles having a mesh size less than 325 mesh.

9. The composite product as defined in claim 1, wherein said polymer is polysulfone, and said particles are glass particles constituted of about 96% silicon dioxide and about 4% $B_2O_3$, $Al_2O_3$, $Cr_2O_3$, and the pore diameter is about 35–45 A.

References Cited

UNITED STATES PATENTS

| | | | |
|---|---|---|---|
| 2,487,207 | 11/1949 | Adams | 260—2.5B |
| 2,670,339 | 2/1954 | Edmunds | 260—2.5B |
| 2,711,977 | 6/1955 | Butsch | 260—2.5L |
| 3,228,905 | 1/1966 | Talalay et al. | 260—2.5L |
| 3,238,172 | 3/1966 | Talalay et al. | 260—2.5L |
| 3,256,218 | 1/1966 | Knox | 260—2.5B |

SAMUEL H. BLECH, Primary Examiner

M. FOELAK, Assistant Examiner

U.S. Cl. X.R.

55—16, 158; 136—86; 210—503; 260—37, 41, 899, 900